July 30, 1963 E. L. WALINSKI 3,099,454
FLUID SEAL
Filed May 5, 1961
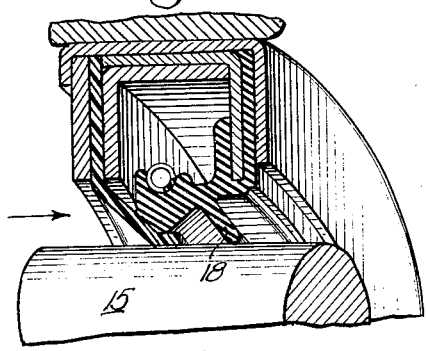
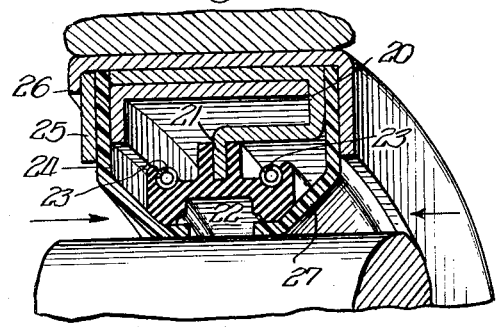
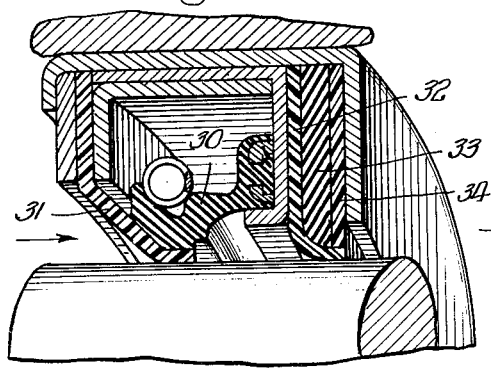
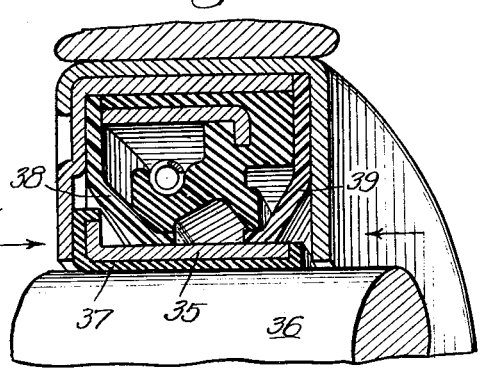
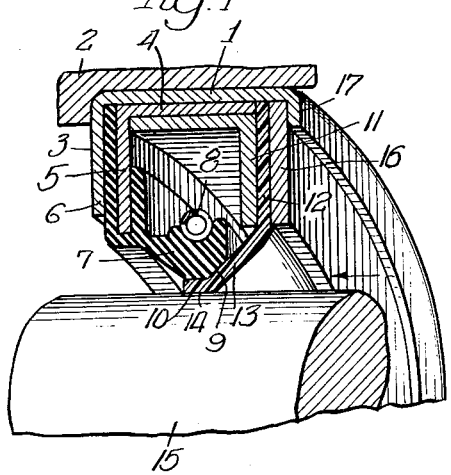
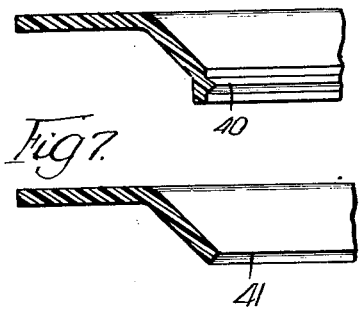
INVENTOR.
Edward L. Walinski,
BY George H. Simmons
ATTYS.

United States Patent Office 3,099,454
Patented July 30, 1963

3,099,454
FLUID SEAL
Edward L. Walinski, Des Plaines, Ill., assignor to Victor Manufacturing & Gasket Company, Chicago, Ill., a corporation of Illinois
Filed May 5, 1961, Ser. No. 108,148
8 Claims. (Cl. 277—47)

This invention relates to fluid seals and has for its principal object the provision of a new and improved device of this kind.

It is a main object of the invention to provide, in an encased lip type fluid seal, a sleeve composed of a high temperature resistant low friction material that is impervious to the fluid being sealed and is located between the lip and a shaft and between the lip and the fluid being sealed, so as to shield the lip and the garter spring of the device from the fluid being sealed.

Another object of the invention is to provide, in an encased lip type fluid seal in which a high temperature resistant low friction sleeve shields the lip from the fluid being sealed, an auxiliary sealing lip which prevents the entry of extraneous matter into the device.

Another object of the invention is to provide, in an encased lip type fluid seal having a main and an auxiliary lip, sleeves composed of a high temperature resistant low friction material and located between the lips and the fluids being sealed to protect the lips from those fluids.

Another object of the invention is to provide, in a self-contained encased seal that has sealing lips and a mating surface therefor incorporated within the casing, high temperature resistant low friction sleeves engaging the mating surface and held in seal forming engagement therewith by the lips, which sleeves shield the lips from the fluid being sealed.

Another object of the invention is to provide a lip type sealing device capable of sealing fluids at high temperature and capable of being manufactured at low cost without sacrificing quality.

Further objects of the invention not specifically mentioned here will be apparent from the detailed description and claims which follow, reference being had to the accompanying drawing in which a preferred embodiment of the invention is shown by way of example and in which:

FIG. 1 is a cross-sectional view of a single lip seal embodying the invention;

FIG. 2 is a view similar to FIG. 1 and showing the invention applied to a seal having an auxiliary lip;

FIG. 3 is a cross-sectional view showing the invention applied to a double lip seal;

FIG. 4 is a view similar to FIG. 1, showing the invention applied to a different type of seal;

FIG. 5 is a cross-sectional view showing the invention applied to a self-contained double lip seal;

FIG. 6 is a cross-sectional view showing a modified form of sleeve; and

FIG. 7 is a view similar to FIG. 6, showing still another form of sleeve.

Fluid seals, consisting of an outer casing in which is fixed an elastomer element that terminates in a sealing lip which is pressed against a shaft to form a seal therewith, are common in the prior art of which I am aware.

It is common practice to form elastomer elements of such devices from the lower cost elastomers including Buna N and neoprene. Such materials are eminently successful under conditions where the temperature of the fluid being sealed is below 225° F. In instances where hotter fluids are encountered, these elastomers become hardened and thereby lose their elasticity and failure of the sealing device soon results.

There are available upon the open market more expensive elastomeric materials, including but not limited to silicone rubbers and polyacrylics which are capable of withstanding higher temperatures than the lower cost elastomers. The advantages gained by using expensive, better heat resistant elastomeric compounds for the sealing element, is largely lost if the garter spring does not function. It is a known fact that lubricating oils and grease actually carbonize to a solid mass when subjected to elevated temperatures and if the lubricant which is in contact with the garter spring by which the seal lip is maintained in seal forming engagement with the shaft becomes solidified the garter spring cannot function. A carbonized garter spring becomes in effect a ring, and since the elasticity of the garter spring is lost the elasticity of the sealing device is lost and failure results.

The present invention seeks to provide a sealing device that overcomes the foregoing objections to prior art devices so that seal can be maintained for a satisfactorily long period of time, even though the fluid being sealed is at an elevated temperature. There is available upon the open market an elastomer known as tetrafluoroethylene, commercially known as Teflon, which is capable of withstanding temperatures up to 500° F., and in addition this material is known to have a low coefficient of friction and to be impervious to most fluids likely to be encountered.

The present invention contemplates a sealing device having an outer casing preferably composed of metal, in which is fixed an elastomer element composed of Buna N or neoprene, which element terminates in a lip-like structure that is urged radially inwardly by a garter spring. Fixed in the casing on the side thereof engaged by the fluid to be sealed is a Teflon sleeve that extends radially inwardly and terminates between the shaft and the garter spring pressed lip. This Teflon sleeve prevents entrance of the fluid being sealed from coming into contact with the lip of the diaphragm as well as supporting garter spring and as a result hardening of the flexible lip which holds the garter spring and immobilization of the garter spring due to carbonization of the lubricant are both definitely eliminated even though the temperature of the fluid being sealed is sufficiently high to harden the elastomer were it to come into contact therewith.

The teachings of the present invention can be applied to a single lip seal, to a sealing device having a single lip and an auxiliary lip that prevents entrance of extraneous matter into the device. The invention can also be applied to double lip seals, both of which lips are protected by Teflon sleeves thereby to maintain a seal disposed between two different bodies of fluid, one or both of which may be at an elevated temperature. The teachings of the present invention may also be applied to self-contained seals in which a mating surface with which the sealing lips engage is incorporated in the casing of the device.

The invention will be best understood by reference to the accompanying drawings. From FIG. 1, it will be seen that in its preferred form the seal consists of a casing composed of an outer shell that has an outer cylindrical wall 1 dimensioned to form a fluid tight seal in a bore in a housing member 2. An annulus 3 extends radially inwardly from one end of the cylindrical portion 1. Fitted within this outer shell is an inner shell consisting of a cylindrical wall 4 telescoped into the wall 1, and an annulus 5 that extends radially inwardly from one end of the wall 4.

Bonded to the inner shell is an elastomer element having an annulus 6 clamped between the annuli 3 and 5. A lip 7 projects radially and axially from the inner edge of the annulus 6 and a garter spring 8 encircles this lip. It will be noted that the lip 7 contains a frusto-conical surface 9 at its distal end, and that there is an inner cylindrical surface 10 adjacent the surface 9.

Fitted within the inner shell is an L-shaped clamping ring 11 against which the annular portion of a Teflon sleeve 12 is engaged. The sleeve contains an inwardly extending frusto-conical portion 13 and a cylindrical portion 14 disposed between the cylindrical suurface 10 of the lip and the shaft 15. A washer 16 engages the annulus 12 of the sleeve and a flange 17 on the outer wall 1 clamps the assembly together as a unit. The fluid being sealed engages the device from the right, as seen in FIG. 1, as indicated by the arrow, and is prevented from engaging the lip 7 and garter spring 8 by the Teflon sleeve.

The embodiment of the device shown in FIG. 2 is the same as that in FIG. 1, except that the elastomer includes a frusto-conical auxiliary lip 18 that engages the shaft 15 on the side of the device away from the fluid being sealed. The lip 18 prevents entry of extraneous matter into the sealing device.

In FIG. 3, I have shown a double seal in which the inner shell of the casing has inner and outer cylindrical portions joined together by an annular portion 20. A second annular portion 21 projects radially inwardly from the distal end of the inner cylindrical portion and a double lip elastomer element 22 is bonded to the portion 21. Garter springs 23 encircle the lips.

A clamping ring is used as before and the Teflon sleeve 24 is clamped thereagainst by a washer 25 and a flange 26 on the outer shell. A second Teflon sleeve 27 is clamped between the radial portion 20 of the inner shell and the annular portion of the outer shell. Fluids being sealed engage the devices on both faces thereof and the Teflon sleeves 24 and 27 prevent that fluid from coming into contact with the sealing lips and garter springs.

The embodiment of the invention shown in FIG. 4 follows the general arrangement as above, except that the elastomer element 30 is clamped in the inner shell of the casing in the manner taught in the Victor Patent 2,468,247, issued April 26, 1949. In addition to the Teflon sleeve 31 by which the fluid being sealed is shielded from the lip and garter spring, a second Teflon sleeve 32 is provided and urged against the shaft by a compression ring 33 that is composed of a synthetic rubber compound. A sealing washer 34 composed of an elastomer such as Buna N or neoprene, is disposed between the compression ring 33 and the annulus of the outer shell. The Teflon sleeve 32 prevents entrance of fluid or other material that is in engagement with the associated face of the device from entering into the device.

In FIG. 5, I have shown a self-contained seal the general structure of which will be recognized as basically the same as in the embodiments shown in the other figures, to which basic structure a mating cylinder 35 is provided and secured on the shaft 36 by a wall of suitable elastomer 37. The lip and garter spring of the device are shielded from the fluid being sealed, by a Teflon sleeve 38, and the auxiliary lip is shielded from engaging fluid by a second Teflon sleeve 39, both of which sleeves terminate in inner cylindrical portions that engage the mating surface and are maintained in seal forming engagement therewith by the lips.

The Teflon sleeves in each of the embodiments shown in FIGS. 1 to 5, inclusive, terminate in an inner cylindrical portion which engages the shaft or mating surface, as the case may be. In FIG. 6 I have shown a modified form of sleeve in which this inner cylindrical portion has projecting inwardly from it a rib 40 which is V-shaped in cross section. This rib 40 presents a narrow surface for engagement with the shaft or mating surface and the sleeve is advantageous under conditions where essentially line contact is desirable.

In FIG. 7, the Teflon sleeve is frusto-conical throughout, and when the inner edge of this sleeve engages a shaft essentially line engagement will be achieved, as indicated at 41.

The Teflon sleeve used in the devices of the present invention are either molded to the desired shape from molding powder or formed from a sheet of the material. The thickness of the sleeves preferably is about .030", with the result that they are sufficiently flexible to maintain seal with a shaft even though that shaft be out of round or not located concentrically of the casing of the device.

Throughout this specification the sleeves have been described as composed of Teflon. While this material is well suited for this purpose, the use of other suitable materials is contemplated, including but not limited to nylon and Adiprene, and I am not to be limited to using Teflon.

From the foregoing, it will be apparent that the present invention provides an effective way of preventing fluids from coming into contact with the lip and garter spring of a sealed device and that as a result relatively inexpensive elastomers can be used in the lips, notwithstanding that the fluid to be sealed is at a temperature above that which hardens such elastomers. Since the garter spring is likewise shielded from the fluid being sealed, carbonization of oil on this spring is definitely prevented even though the fluid being sealed is an oil at a temperature sufficiently high to carbonize on the spring were it to be in contact therewith.

In the drawings I have shown preferred embodiments of the invention by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A fluid sealing device comprising: a casing; elastomer lip means fixed in said casing; garter spring means encircling the lip means and urging the same radially inwardly; and sleeve means fixed in the casing on the side thereof opposite the side on which the lip means is fixed and extending from the casing alongside the lip means and between the lip means and a shaft to form a seal with the shaft and to shield the lip means and the garter spring means from that fluid.

2. A device as specified in claim 1, in which the sleeve means is composed of a high temperature resistant low friction material that is impervious to the fluid being sealed and is fixed in the casing by clamping.

3. A device as specified in claim 2, in which the sleeve means is composed of tetrafluoroethylene.

4. A device as specified in claim 3, in which the lip means consists of a single lip fixed in the casing by bonding.

5. A device as specified in claim 4, in which the lip means contains an auxiliary frusto-conical shaft engaging portion which prevents entry of extraneous matter into the device.

6. A device as specified in claim 1, in which the lip means comprises two lips each encircled by a garter spring and in which the sleeve means comprises two sleeves one fixed outwardly of each lip to shield the lips and garter springs from fluids on both faces of the device.

7. A sealing device comprising: outer and inner cylindrical shells telescoped together, each having an inwardly extending annulus at one of its ends, an elastomer element bonded to the inner shell and having an annular portion disposed between the annuli of the shells and a lip extending inwardly and axially away from the inner edge of said annular portion and having a cylindrical inner face at its distal end; a garter spring encircling said lip; a clamping ring telescoped into the inner shell and having an annular portion extending radially inwardly into juxtaposition to the distal end of the lip; a sleeve engaging the annular portion of said ring and the inner cylindrical face of said lip to shield the lip and garter spring from the fluid being sealed; a washer engaging the ring engaging portion of said sleeve; and a flange on said outer shell engaging said washer to hold the device together as a unit.

8. A sealing device comprising: an outer shell having a cylindrical portion and an annulus extending radially inwardly from one end thereof; an inner shell having a cylindrical portion telescoped in said outer shell and an annulus projecting radially inwardly from the cylindrical portion and spaced from the annulus of the outer shell; an elastomer element bonded to said inner shell and having an annulus disposed between the annuli of said shells and a lip portion projecting radially and axially inwardly from said annulus; a garter spring encircling said lip and tensioned to urge the lip inwardly; a clamping ring having a cylindrical portion telescoped into said inner shell with one of its ends abutted against the annulus thereof and having an annulus extending radially inwardly from the other end of the ring; a sleeve having an annulus engaging the annulus of said ring and having a frusto-conical portion extending inwardly from the inner end of its annulus and having a cylindrical portion engaging the inner surface of said lip; a spacing washer engaging the annulus of said sleeve; and a flange on the end of the cylindrical portion of the outer shell remote from the annulus thereof, which flange engages said washer to clamp the device together as a unit.

References Cited in the file of this patent

UNITED STATES PATENTS

| | | |
|---|---|---|
| 1,977,081 | Olsen | Oct. 16, 1934 |
| 2,804,324 | Stallings | Aug. 27, 1957 |